Feb. 21, 1967  G. O. EBREY  3,304,693
DEHYDRATION PROCESS
Filed Dec. 12, 1963
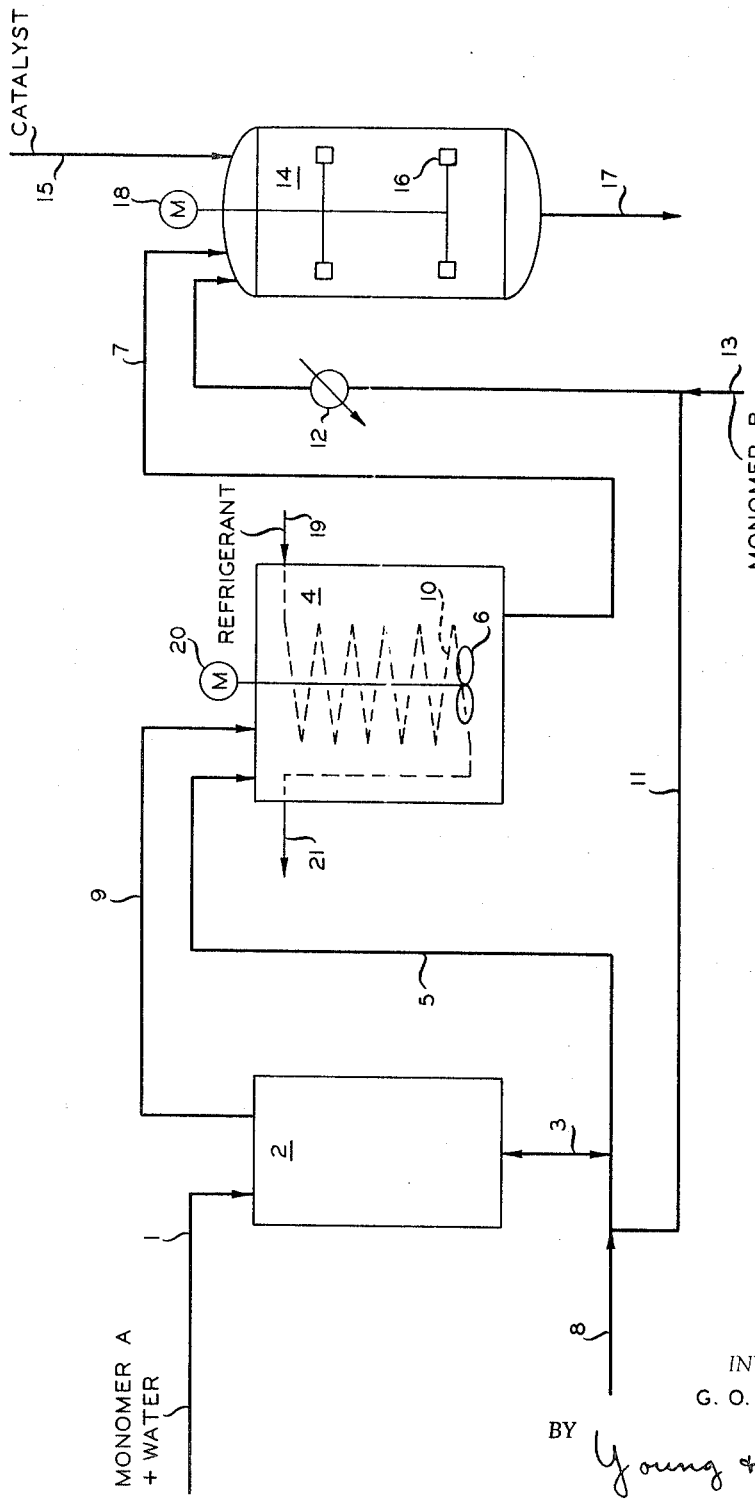
INVENTOR.
G. O. EBREY
BY Young & Quigg
ATTORNEYS United States Patent Office 3,304,693
Patented Feb. 21, 1967

3,304,693
DEHYDRATION PROCESS
Glenn O. Ebrey, Copan, Okla., assignor to Phillips
Petroleum Company, a corporation of Delaware
Filed Dec. 12, 1963, Ser. No. 330,043
5 Claims. (Cl. 55—33)

This invention relates to dehydration. In one aspect this invention relates to dehydration processes employing solid adsorbents. In another aspect this invention relates to an improved batch process for dehydrating fluids.

It is frequently desirable, and many times necessary, to remove moisture and other impurities from fluids. Very frequently last traces of moisture must be removed from certain organic substances such as gasoline, alcohols, esters, and the like, to forestall adverse effects, such as corrosion, during use. Also, polymerizable hydrocarbons which contain water and impurities must be purified and dried prior to use as a reaction monomer to prevent inactivation of the catalyst by the water and impurities.

It is known that adsorbent materials such as bauxite-activated alumina, silica gel, charcoal, diatomaceous earth, and the like, have desiccating properties and that such materials may be reactivated and reused. It is also known that such adsorbent materials remove polymerization inhibitors from streams containing polymerizable compounds. Such adsorbents generally have a limited capacity for water and impurities and require reactivation or regeneration which involves removing the adsorbed water and other adsorbed contaminants therefrom. In conventional practice the fluid to be dehydrated is passed through a bed of the solid adsorbent which removes the water and contaminants by adsorbing them. When the adsorbent has become substantially inactive due to hydration, it is regenerated by heating with hot dry gases which extract the water as water vapor and remove the other contaminants. Various processes and methods have been provided for regenerating solid adsorbents such as flushing the adsorbent with an inert fluid after the dehydration of a material and then passing hot gases therethrough. This method is particularly advantageous when the solid adsorbent has been used in dehydrating a stream containing polymerizable compounds. Polymerizable compounds associated with the solid adsorbent during the regeneration thereof tend to polymerize due to the increased temperatures and thus plug and foul the adsorbent. Therefore the step of flushing the stream containing polymerizable compounds from the adsorbent eliminates polymerization thereof during the regeneration step when polymerizing conditions occur. Due to the ever-increasing demand for polymers and resins obtained by polymerization, various processes have been devised for polymerization of various monomers. Particularly advantageous in some instances is a batch polymerization process. In such processes the materials are not used continuously but a certain quantity is required at frequent intervals. In this regard, when a stream containing polymerizable compounds is passed through an adsorbent for dehydration and removal of polymerization contaminants such as inhibitors, the adsorbent can become contaminated during the time that the monomer is not flowing through the dehydrating material.

Accordingly it is an object of this invention to provide an improved method for dehydration employing a solid adsorbent. It is another object of this invention to provide a novel method for placing an active adsorbent in stand-by after being used for dehydrating a stream containing polymerizable compounds. It is still another object of this invention to provide a batch process for dehydration of fluids. It is still a further object of this invention to prevent contamination of solid adsorbents employed intermittently to dehydrate fluids which contain polymerizable compounds.

Other objects and advantages of this invention will become apparent to those skilled in the art from further study of this disclosure, drawing and appended claims.

In accordance with this invention, a desired quantity of a fluid containing polymerizable compounds is dehydrated by passing same through an adsorbent. An inert fluid is then passed through the adsorbent to flush the polymerizable compounds therefrom. The adsorbent remains associated with the inert fluid until dehydration of polymerizable compounds is required or the adsorbent has become inactive due to the absorbed moisture.

Various polymerization processes are known and being practiced wherein the monomers employed must be free of moisture, as moisture is a poison for the catalyst employed in the polymerization. One such process is the polymerization of conjugated dienes in the presence of a catalyst and a liquid diluent to form a rubbery polymer. The conjugated dienes may be polymerized alone to make a homopolymer or with other monomers to make copolymers. Generally the conjugated dienes contain from 4 to 8 carbon atoms per molecule. Examples of such conjugated dienes include 1,3-butadiene, 2-methyl-1,3-butadiene, 2,3-dimethyl-1,3-butadiene, 2-methyl-1,3-pentadiene, chloroprene, and the like. These conjugated dienes can also be polymerized with one or more compounds containing an active $CH_2=C<$ group. Such compounds include aliphatic 1-olefins having 2 to 8 carbon atoms per molecule such as ethylene, propylene, 1-butene, 1-hexane, and 1-octene. Branched-chain olefins, such as isobutylene, can also be used as a comonomer. Other compounds containing an active $CH_2=C<$ group are styrene, divinylbenzene, 3-methylstyrene, vinyl chloride, and the like.

The catalyst systems which are used in the polymerization of conjugated dienes include compounds selected from the group consisting of organic metals or metal hydrides, the metals being one of Groups I, II, or III of the periodic table. Such catalyst systems include (a) a hydride or organo compound of one of the metals aluminum, gallium, indium, thallium and beryllium; and (b) a di-, tri- or tetrahalide of the Group IV metals, such as titanium, silicon, zirconium, thorium, tin, lead, hafnium, germanium or cerium.

Suitable diluents for use in such polymerization processes are paraffins, cycloparaffins and/or aromatic hydrocarbons which are relatively inert, nondeleterious and liquid under the reaction conditions of the process. The lower molecular weight paraffins, such as propane, butane and pentane, are especially useful when the process is carried out at low temperatures. However, the higher molecular weight paraffins and cycloparaffins, such as isooctane, cyclohexane, methylcyclohexane, and aromatic diluents, such as benzene, toluene, and the like, as well as mixtures of these diluents, can also be used. Reactor residence time can vary widely, for example, from one second to one hour or more.

In batch polymerization processes wherein the requirement for monomers is intermittent, it is necessary that the monomers be dehydrated and purified in an intermittent or batch operation. Streams containing monomeric compounds are generally protected from polymerization by the addition of polymerization inhibitors thereto during storage and transportation. Typical polymerization inhibitors include, for example, tertiary butyl catechol, pyrogallol, n-butylpyrogallol, resorcinol, 2,6-dinitro-4-chlorophenol, aminothiophenol, alpha naphthol, beta-dinaphthol, p-phenyl phenol, pentachlorophenol, and the like. As noted above prior to the polymerization reaction, the monomeric materials must be free of polymerization inhibitor and water. I have found that it is often desirable in batch operations to dehydrate a desired or required quantity of monomeric material which does not contain sufficient moisture and contaminants to deactivate the solid adsorbent employed for the dehydration thereof. However, when the adsorber is used intermittently, the adsorbent decreases in capacity faster than if it were continuously used to dehydrate polymerizable material. When the adsorbent has been used but is not deactivated, it is not always desirable to regenerate it at that time for economic reasons. Accordingly, I have found that the monomeric material may be flushed from the adsorbent with an inert material and then the adsorbent can be placed in stand-by for an indefinite length of time without adverse effects thereto. The increased capacity resulting from flushing the adsorbent with an inert material may be due to traces of contaminants and minute quantities of residual monomer being flushed from the adsorbent.

My invention will now be described more fully with reference to the drawing which includes a schematic flow sheet of a copolymerization process showing the dehydration of the monomer and reactor.

Referring now to the drawing, a stream containing polymerizable compounds, inhibitor and water is introduced through conduit 1 to vessel 2 containing a solid adsorbent and termed an adsorber. As such stream passes through adsorber 2, the water and inhibitor is adsorbed by the adsorbent and the polymerizable compound is removed therefrom through conduit 3 and introduced to storage vessel 4 through conduit 5. An inert fluid, such as a solvent for the reaction employing the polymerizable compound dehydrated, is introduced through conduit 8 into conduit 3 and thence through adsorber 2, flushing the residual monomer compound therefrom through conduit 9 and into storage vessel 4. Storage vessel 4 is equipped with agitator 6 driven by motor 20 and refrigerant coil 10 having inlet conduit 19 and outlet conduit 21. Since the monomer compound has been freed of inhibitor in storage tank 4, the temperature is maintained low to prevent polymerization thereof. As required, the required quantity of polymerizable compound is removed from storage tank 4 and introduced into reactor 14 through conduit 7. Reactor 14 is equipped with stirrers 16 driven by motor 18. Catalyst is introduced into the reactor through conduit 15. Solvent from conduit 8 passes through conduit 11, cooler 12 and then into reactor 14 for supplying the diluent for the reaction. If the reaction to be conducted is a copolymerization, a second monomer is introduced through conduit 13 to conduit 11 prior to cooler 12. The reaction medium is removed from reactor 14 through conduit 17 and passed to various recovery equipment, not shown.

*Example*

Styrene and 1,3-butadiene are copolymerized in accordance with the aforedescribed process. Again referring to the drawing, adsorber 2 is a 500-gallon vessel containing activated alumina and operated at atmospheric temperature. Storage vessel 4 is a 4,000-gallon vessel maintained at a temperature of 30° F. by propane refrigerant passing through coil 10. A water-saturated styrene stream containing 10–15 parts per million tertiary butyl catechol (inhibitor) is passed through adsorber 2 and into storage tank 4 at a rate of 25–30 g.p.m. until approximately 4,000 gallons of dehydrated styrene is obtained liquid. Toluene in the amount of 1,000 gallons is passed through adsorber 2 and into storage tank 4. Approximately 50 gallons of styrene-toluene mixture from storage vessel 4 is withdrawn through conduit 7 and introduced into reactor 14, 10–12 times per day. In this example it is apparent that sufficient styrene is dehydrated in adsorber 2 in approximately 2 hours to satisfy the reaction requirements for about a week. The quantity of styrene passing through adsorber 2 does not deactivate the alumina therein and the toluene employed to flush the adsorber permits the alumina to retain its capacity. At the end of a week, water-saturated styrene containing 10–15 parts per million tertiary butyl catechol is again passed through the alumina and into the storage vessel in a quantity required for a week's operation of reactor 14. After sufficient dehydration of the styrene stream, adsorber 2 has become deactivated, and is regenerated by passing heated air therethrough to remove the adsorbed water and contaminants. Depending upon the size of the adsorber and the concentration of moisture in the feed, the adsorber may be placed in stand-by by flushing with solvent a plurality of times before the adsorbent is deactivated.

It is readily apparent from the above example that I have provided an improved method for preventing loss of capacity of the solid adsorbents by placing them in stand-by when only partially deactivated without requiring immediate regeneration.

Although my invention has been described with reference to a particular monomer and polymerization process, it is to be understood that my invention is applicable to the dehydration of any fluid for use in any polymerization process or otherwise. Also, my invention is applicable to fluidized, moving bed adsorbent systems, as well as stationary adsorbent beds.

Various modifications will be apparent to one skilled in the art from the study of this invention which will not depart from the spirit and scope thereof.

I claim:

1. A process for dehydrating a first fluid consisting essentially of monomer which will tend to polymerize if subjected to hot air regeneration and water which comprises:

in a first step passing a quantity of said first fluid through a dehydrating adsorbent for a period of time insufficient to exhaust the adsorptive capacity of said adsorbent; and in a second step passing a second fluid consisting essentially of a liquid solvent for said monomer through said adsorbent to flush the residual first fluid therefrom;

repeating said first and second steps until the adsorption capacity of said adsorbent is exhausted;

and then regenerating said adsorbent by passing heated air therethrough.

2. The process of claim 1 wherein said second fluid is a material inert to said adsorbent and said first fluid.

3. The process of claim 1 wherein said first fluid contains styrene, said second fluid is toluene, and said adsorbent is alumina.

4. The process of claim 3 wherein said first fluid further contains a polymerization inhibitor.

5. The process of claim 4 wherein said inhibitor is tertiary butyl catechol.

References Cited by the Examiner

UNITED STATES PATENTS

| 2,228,788 | 1/1941 | Soday | 260—669 |
| 2,389,251 | 11/1945 | Franz | 260—669 |
| 2,412,504 | 12/1946 | Goldfinger | 260—669 |
| 2,987,175 | 6/1961 | Bottum | 55—387 |
| 3,080,433 | 3 1963 | Hengstebeck | 260—669 |
| 3,240,830 | 3/1966 | Dye | 260—669 |

FOREIGN PATENTS 843,503   8/1960   Great Britain.

OTHER REFERENCES

The Condensed Chemical Dictionary, sixth edition, 1961, page 1149.

REUBEN FRIEDMAN, *Primary Examiner.*

C. N. HART, *Assistant Examiner.*